Dec. 11, 1956 F. W. LINDBLOM 2,773,423
BRIDGE STRUCTURE
Filed Oct. 21, 1952
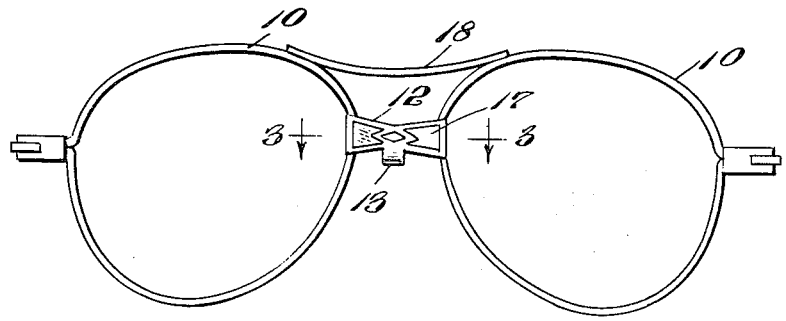
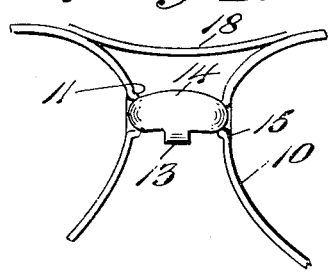
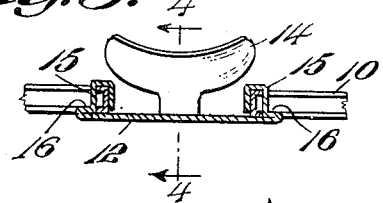
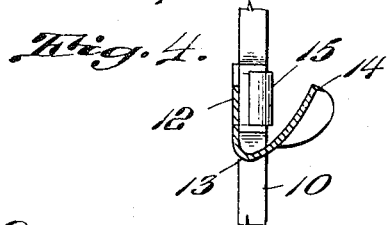
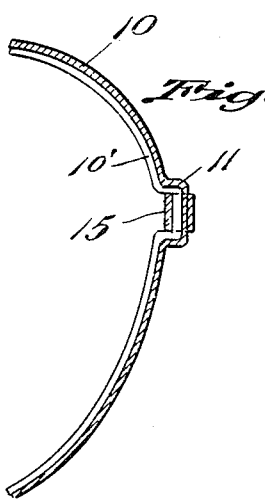
INVENTOR.
Frank W. Lindblom
BY
Barlow & Barlow
ATTORNEYS.

United States Patent Office 2,773,423
Patented Dec. 11, 1956

2,773,423

BRIDGE STRUCTURE

Frank W. Lindblom, Warwick, R. I., assignor to Welsh Manufacturing Company, a corporation of Rhode Island Application October 21, 1952, Serial No. 316,004

2 Claims. (Cl. 88—43)

This invention relates to a bridge structure in an eyeglass frame and more particularly to the combination of a bridge and nose pad.

One of the objects of this invention is to provide a bridge structure with an integral nose pad.

Another object of this invention is to provide a bridge structure which will cover the connection made to the eye wires and lend a more pleasing appearance to the eyeglasses.

Another object of this invention is to fabricate the bridge structure and integral nose pad from one piece of flat sheet stock material and which will be inexpensive in construction.

With these and other objects in view, the invention consists of certain novel features of construction as will be more fully described and particularly pointed out in the appended claims.

In the accompanying drawings:

Figure 1 is a front view of the spectacle frame;

Figure 2 is a partial rear view of the spectacle frame showing particularly the bridge connection;

Figure 3 is a sectional view taken on lines 3—3 of Figure 1;

Figure 4 is a sectional view of the bridge structure taken on lines 4—4 of Figure 3;

Figure 5 is a sectional view of one of the eye wires showing the manner in which the bridge is attached thereto; and Figure 6 is a top view of the combination bridge and nose pad structure ready for assembling in the spectacle frame.

In proceeding with this invention, I provide a pair of eye wires and offset a portion of each wire at corresponding points. I further provide a flat piece of material and form it with two projecting lugs and a nose pad extending rearwardly of one flat surface thereof. I then bend the lugs around the offset portions of the eye wires which results in the material becoming a bridge in the assembly.

With reference to the drawings, 10 designates the eye wires which are formed with peripheral offset portions 11 as shown in Figure 5. Grooves 10′ are provided in the eye wires to receive lenses in the usual manner. A bridge structure 12 made out of flat sheet material is provided with a depending arm portion 13 which is bent rearwardly and which has an enlarged portion 14 at the end thereof. The section 14 is generally curved in shape and is formed so as to rest smoothly upon the fore part of the nose. A pair of lugs 15 extend from either side of the bridge member 12 and are first bent inwardly toward each other as at 16 to lie against the rear surface of the bridge 12 and then rearwardly as shown more particularly in Figure 6. The rearwardly extending portions of the lugs 15 are passed around the eye wires 10 at the offset portion 11 and are firmly attached thereto by such bending, as shown in Figure 3, to form a good mechanical joint. Should it be desired to prevent loosening of these parts, solder may also be applied.

With the structure described above it will be noted that since the lug 15 is bent back as at 16, this forms a projection at either end of the bridge structure 12 which serves to cover the joint made at the eye wire. The offset portion 11 readily adapts the spectacle frame to standard lenses, inasmuch as it is not necessary to provide a special notched lens for the joint made at this point by the bridge lugs 15. The eye wires 10 are split at their temporal ends and have lugs (not shown) attached thereto which fit into the temple hinge joint.

To enhance the appearance of the spectacles, the bridge structure 12 may be provided with a design 17 such as shown in Figure 1. Should it further be desired to strengthen the spectacle frame, an additional bridge structure 18 may be soldered to the tops of the eye wires as shown in Figures 1 and 2.

I claim:

1. In an ophthalmic mounting, a pair of eye wires each having a peripheral outwardly offset portion along its nasal edge, a bridge extending between said eyewires in front of the rims at said offset portions and of a width wider than said offset portion and covering said offset portions, arms attached to the outer ends of the bridge and of a width narrower than the bridge and the offset portions and extending rearwardly from the bridge and through said offset portion and embracing the same to secure the bridge and eyewires together.

2. An ophthalmic mounting as in claim 1 wherein the bridge and arms are of the same piece of material and the arms are doubled back on the bridge and then extend rearwardly between the offset portions of the eye wire and the lens and about the offset portion.

References Cited in the file of this patent

UNITED STATES PATENTS

| | | |
|---|---|---|
| 459,234 | Rubel | Sept. 8, 1891 |
| 756,456 | Bemis | Apr. 5, 1904 |
| 1,180,701 | Day | Apr. 25, 1916 |
| 1,306,540 | Herbert | June 10, 1919 |
| 1,531,628 | Shindel | Mar. 31, 1925 |

FOREIGN PATENTS

| | | |
|---|---|---|
| 382,227 | Germany | Sept. 29, 1923 |
| 314,702 | Great Britain | July 4, 1929 |
| 775,520 | France | Oct. 15, 1934 |